Nov. 1, 1960   F. B. BRYANT   2,958,221
VIBRATORY STRAIN PROBE
Filed June 13, 1957
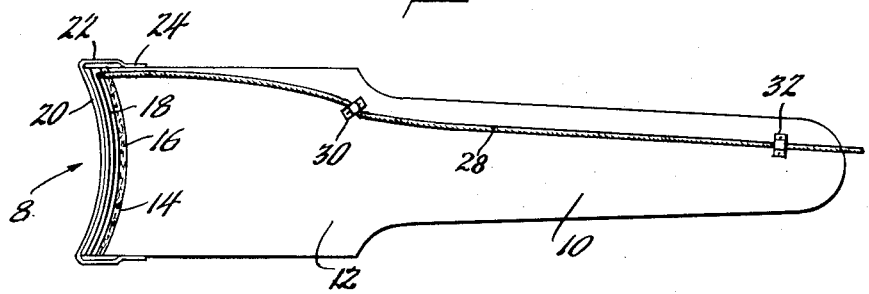
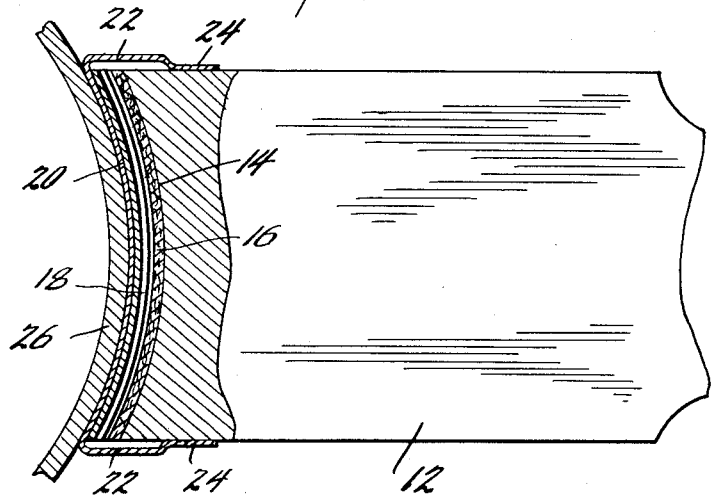
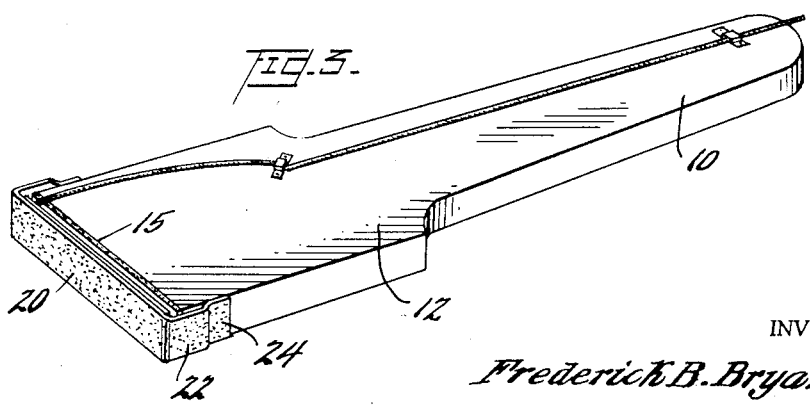
INVENTOR
*Frederick B. Bryant*,
BY
*B. L. Zangwill*
ATTORNEY

United States Patent Office 2,958,221
Patented Nov. 1, 1960

2,958,221

VIBRATORY STRAIN PROBE

Frederick B. Bryant, 8011 Kentbury Drive, Bethesda, Md.

Filed June 13, 1957, Ser. No. 665,615

6 Claims. (Cl. 73—88.5)

(Granted under Title 35, U.S. Code (1952), sec. 266)

The invention described herein may be manufactured and used by or for the Government of the United States for governmental purposes without the payment of any royalties thereon or therefor.

The present invention relates to a vibratory strain probe and more particularly to a strain probe which is portable and may be used to give an indication of the variations of strain over a body such as a ship hull undergoing variations in movement such as may accompany shock. The principal object of this invention is to provide a transient strain gage or sensing element which is portable and reuseable, which features are generally not possessed by other known vibratory strain transducers.

In the past, such transducers, usually consisting of resistance strain gages, have had to be placed and cemented on the structure at the point at which strain is to be measured. They could not then be moved and reused over and over. On a complex structure in which the exact strain pattern could not be predicted in advance it might have been necessary to apply, by cementing in place, a large number of such gages in order to determine the one point of maximum strain. With this invention (the vibratory strain probe) the probe may easily be moved around, observations made rapidly, and a complete exploration made of the strain pattern in the structure so that permanently mounted strain gages can be quickly located the very first time at the desired points which may include the point of maximum strain. It is therefore another object of this invention to provide a portable, easily handled, light weight strain gage or probe for exploring the strain pattern in a structure subject to stresses.

In accordance with the invention a support member is provided to an end of which a strain gage is secured. The other end of the support is provided with a handle so that the whole device is manipulated in one hand of the operator. In use the operator presses the strain gage element against the structure; the gage responding in variation to the stress of the structure. Sensing means of the conventional type connected to the strain gage indicate the response of the strain gage to the stress amplitude of the variation. In the use of equipment of this kind errors might be introduced by stray, varying magnetic or electric fields in the region of the gage or probe or by excessive trembling of the hand of the operator.

Another object of this invention is to provide a manually operated strain probe which will have built-in electric and magnetic or electromagnetic shielding in order to eliminate stray fields which may be in the vicinity of the probe or the object which is being measured.

A further object of the invention is to provide a strain gage probe where the reaction of the support on the strain gage element will be negligible so that the strain gage element will measure the transient strain in an object such as a boat hull and will not be affected by any movement or strains present in the support or handle.

The exact nature of this invention as well as other objects and advantages thereof will be readily apparent from consideration of the following specification relating to the annexed drawing in which:

Fig. 1 is a plan view of the vibratory strain probe showing a preferred embodiment of the invention;

Fig. 2 is a cross-section view of the strain gage and support showing it being applied to an object such as a boat hull; and Fig. 3 is a perspective view of a model having a flat support face for the strain gage.

Referring to Figs. 1 and 2, the vibratory strain probe, indicated in its entirety by the reference numeral 8, consists of a handle 10 and a support member 12 which are generally made as one piece. The handle and support are preferably made of nonmagnetic metal but may be made of magnetic metal or wood or plastic or combinations of suitable materials. The support 12 is generally rectangular in shape with a support face 14 which may be cut to any suitable shape to provide a curve which will fit the object where the strain is to be measured. A strain isolator 16 is placed next to the support face 14 and is generally made of a material such as felt which will not transmit any strain or movement of the support to a strain gage 18 which is mounted on the side of the strain isolator 16 away from the support face 14.

A gripping surface 20 is mounted on the other side of the strain gage and is adapted to be placed in contact with the object where strain is to be measured for increasing the frictional gripping action between the probe and the object. The gripping surface 20 may be made out of any suitable material which will cling to an object such as a boat hull 26. The gripping surface 20 is preferably cemented to the strain gage 18 to provide tight contact therewith. The gripping surface 20 may be made of an abrasive or adhesive material. A suitable material has been found to be emery paper although certain plastics or the like may be used. In practice the gripping surface 20 may be extended to provide a flexible fastening 22 which may be additionally extended to provide a fastening 24 to attach the gripping surface to the support 12.

The flexible fastening 22 may be of other materials such as cloth or rubber or the like and is adapted to provide room for the support 12 to move relative to the strain gage 18 and the strain isolator 16 while a measurement is being made. The strain isolator 16 may be cemented to the strain gage 18 and the gripping surface 20 but it is preferred that it not be cemented or glued to the support face 14 but be allowed to move back and forth thereon. This sliding movement back and forth of the support 12 relative to the strain isolator 16 also prevents any inter-action of the support 12 with the readings on the strain gage 18 which should reflect the strain in the boat hull 26.

The support 12 and possibly the handle 10 may be made of a nonmagnetic metal. Alternatively the support 12 may be made of wood or plastic with a nonmagnetic metallic coating.

The connecting leads to the strain gage may be brought out under the fastening 24 and held by lead clamps 30 and 32 by means of a two conductor sheathed cable, which sheaths is connected to the electromagnetic shielding at the support face 14 at one end of the cable and grounded at the other end of the cable which is connected to the measuring instruments.

One model which has been constructed has the handle 10 and support 12 made of wood in a form similar to Fig. 3 being about 6 inches long, weighing about 2 ounces, and with the support 12 being 1¼ inches wide and ⅜ inch thick. A flat support face 15, which is useful for flat surfaces or on curved surfaces which have a large radius of curvature compared to the length of the support face, is disclosed instead of the curved support face 14. A rectangular strip of fine emery paper about 5 inches long provides the gripping surface 20 and fastenings 22 and 24. A Constantan wire strain gage is cemented to the smooth side of the emery paper by using the paper support to which the gage is normally fastened. The felt pad which is normally fastened to the reverse side of the gage was used as the strain isolator 16 between the gage 18 and the support face 14.

In operation the probe is held by hand with the base strip of the sensing material in contact with the boat hull 26 or object in which the strain is to be measured. The force or pressure required is not critical and may be easily determined by the individual users by observation and experiment. Varying strains in the structure are transmitted by the gripping surface to the wire resistance strain gage in the sensing element; this strain gage output may then be measured and/or recorded by conventional electrical instrumentation. The measurements may be plotted in graphic form to provide an overall survey of the transient strain.

The vibratory strain probe measures transient or slowly changing strains in the object which is to be measured and cannot by its very nature measure the strain which is permanently set up in a boat hull. In many applications however it is desired to set up a test model and measure the transient strain or vibratory strain due to the operation of the motors or during model testing. In a normal application, where a large number of strain gages must be placed on a body, the work required is considerable. In addition a number of measurements must be made and then more permanently mounted strain gages attached to the critical areas with the point of maximum strain, of course, being most important.

The vibratory strain probe will, when the model is set up with a varying strain in the various parts, measure the transient strain and allow the point of maximum strain to be located. The operating forces on the model or the speed of the model may then be changed, the new point of maximum strain may be found, and the resultant strain measured.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A portable strain gauge probe comprising a one-piece support and a handle extending from one end thereof, said support also comprising an exposed outer end face opposite the handle, a strain sensitive element, means attaching said strain sensitive element to said support at said end face, and isolating means between said strain sensitive element and said support for permitting relative movement of the element and the support during strain measurements.

2. A probe as defined in claim 1 wherein said support comprises a non-magnetic material.

3. A portable strain-ascertaining probe comprising a unitary support having an exposed outer face at one end and a handle extending from the other end, resilient means positioned on said end face, a strain sensitive element positioned on the side of said resilient means away from said end face, and means holding said resilient means and element on the support.

4. A portable strain-ascertaining probe comprising a unitary support having an exposed outer face at one end and a handle extending from the other end, strain-isolating means positioned on said end face, a strain sensitive element positioned on the side of said strain-isolating means away from said end face, contact means connected to said element and having an exposed surface for frictional contact with an object, and means holding said strain-isolating means, said element and said contact means on the support.

5. A vibratory strain probe comprising a portable support having a handle, a strain sensitive element, flexible means connected to said element for attaching said strain sensitive element to said support, isolating means positioned between said element and said support and connected to said support for making the effect of any strain or movement of said support negligible upon the output of said strain sensitive element, and means connected to said element for increasing the frictional gripping of said probe on an object whose strain is to be measured, said isolating means comprising felt.

6. A vibratory strain probe comprising a portable and manually operable support having an end face, a strain sensitive element, flexible means connected between said element and said support adjacent said end face, felt isolated means connected to said strain sensitive element and said support end face and slidably relative to said support for making the effect of any strain or movement of said support negligible upon said strain sensitive element, emery paper means connected to said element for temporarily gripping an object whose strain is to be measured, and a handle extending from said support on a side opposite said end face.

References Cited in the file of this patent

UNITED STATES PATENTS

| | | |
|---|---|---|
| 2,074,417 | Olsen | Mar. 23, 1937 |
| 2,568,940 | Wolf | Sept. 25, 1951 |
| 2,599,578 | Obert et al. | June 10, 1952 |